May 20, 1969 H. R. FEICHTER ET AL 3,444,660
PRE-GROUTED CERAMIC TILE ASSEMBLIES
Filed Sept. 1, 1966 Sheet 1 of 8
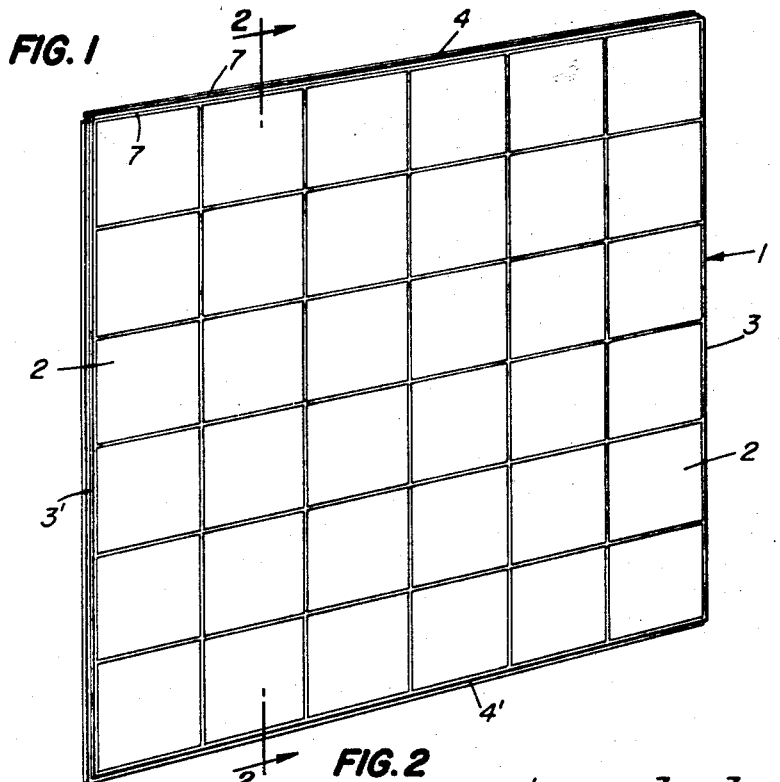
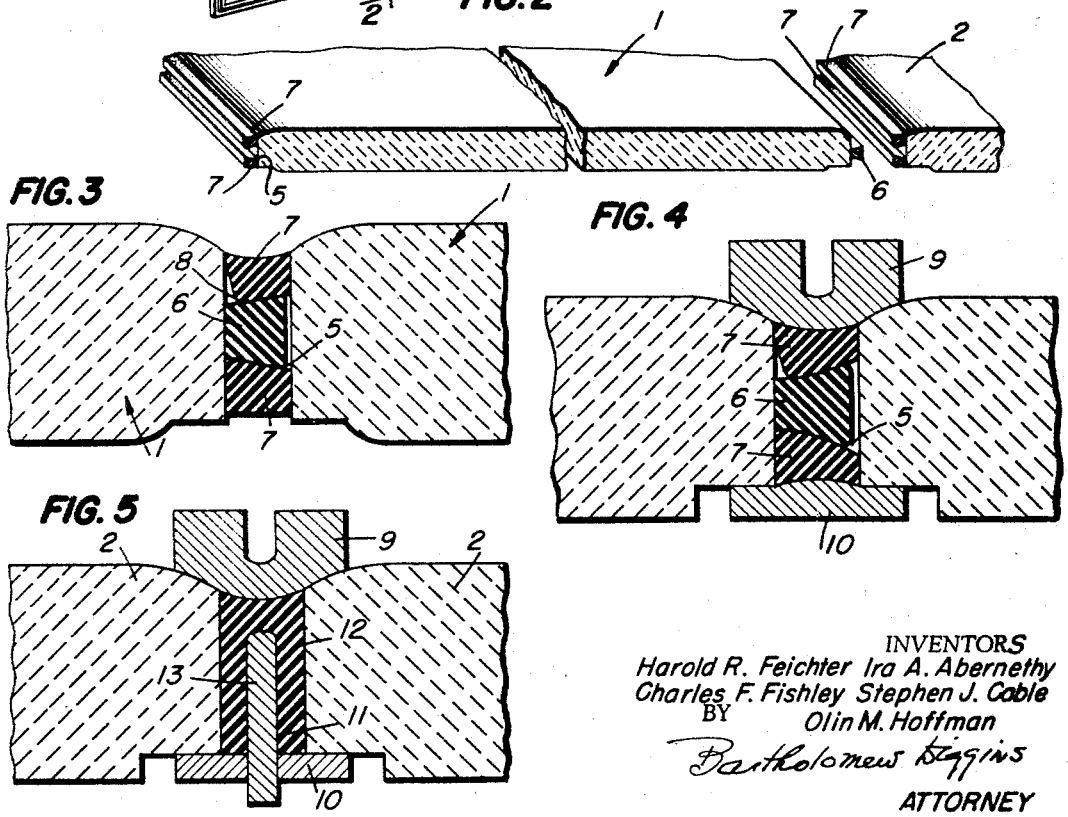
INVENTORS
Harold R. Feichter Ira A. Abernethy
Charles F. Fishley Stephen J. Cable
BY Olin M. Hoffman
Bartholomew Higgins
ATTORNEY

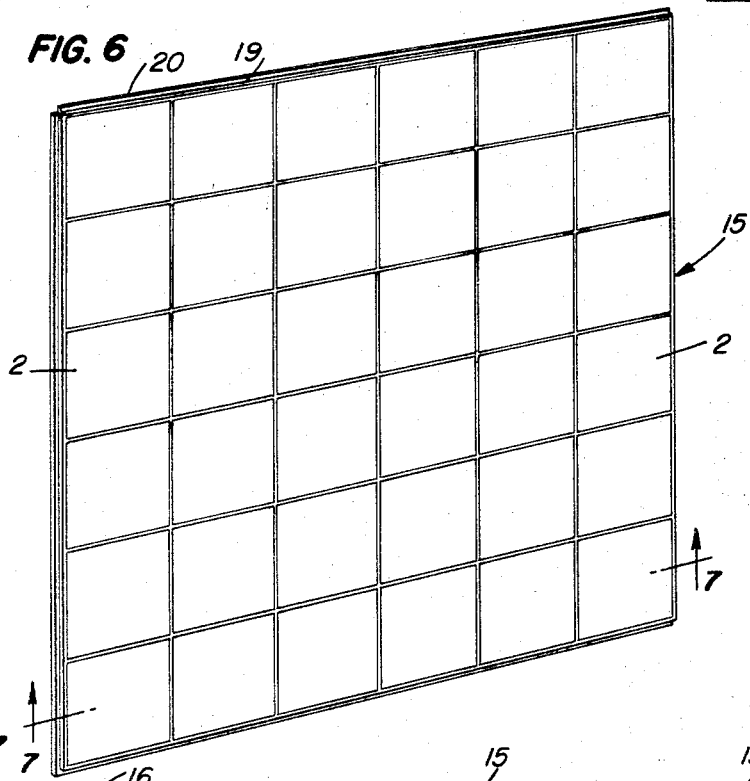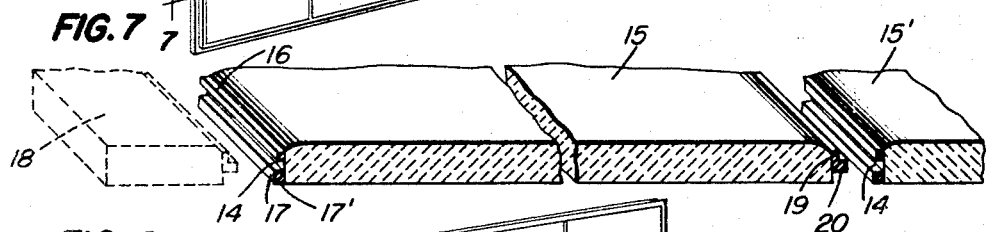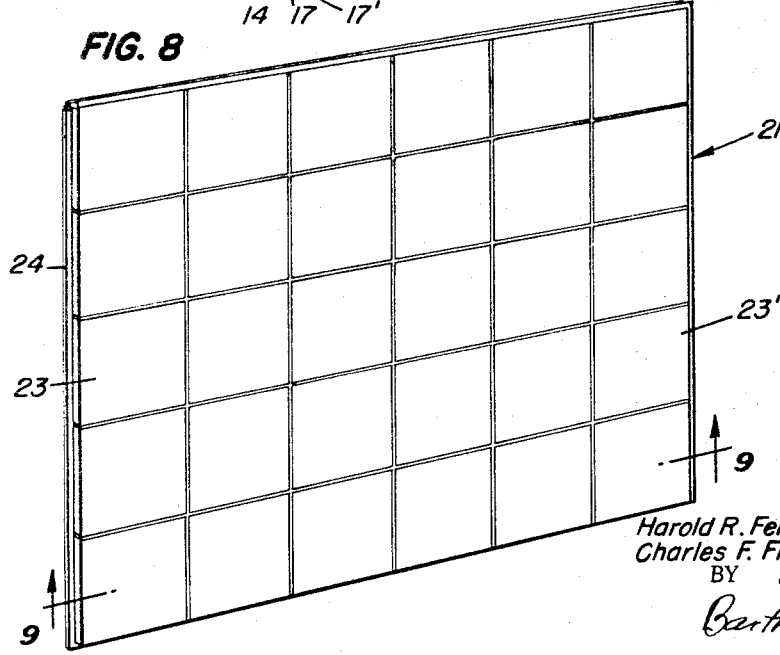

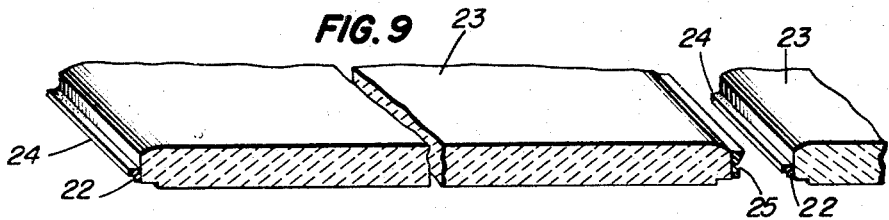
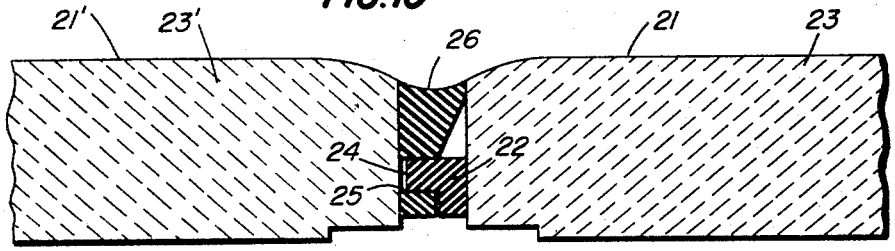
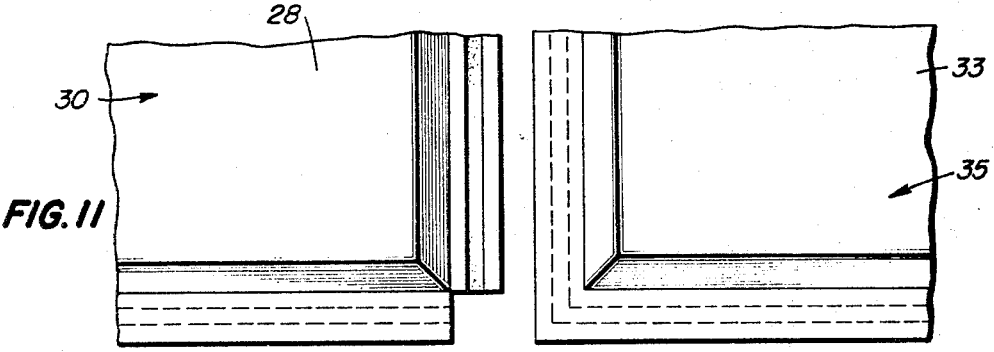
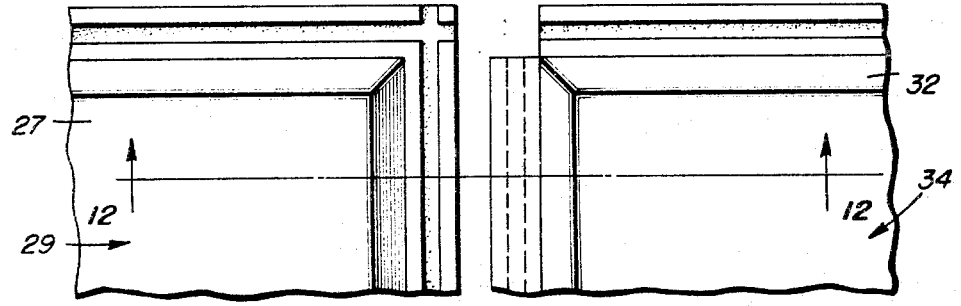
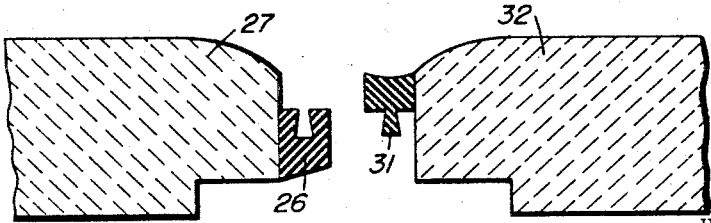
INVENTORS
Harold R. Feichter  Ira A. Abernethy
Charles F. Fishley  Stephen J. Cable
BY       Olin M. Hoffman
ATTORNEY

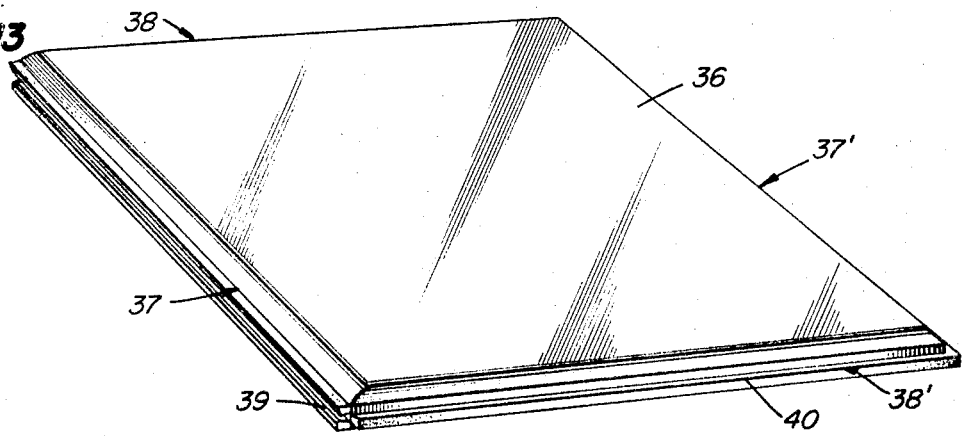
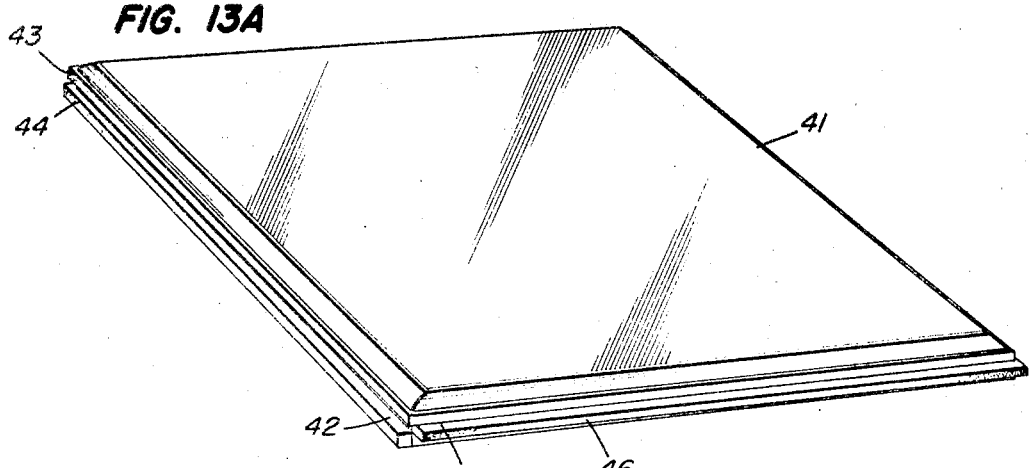
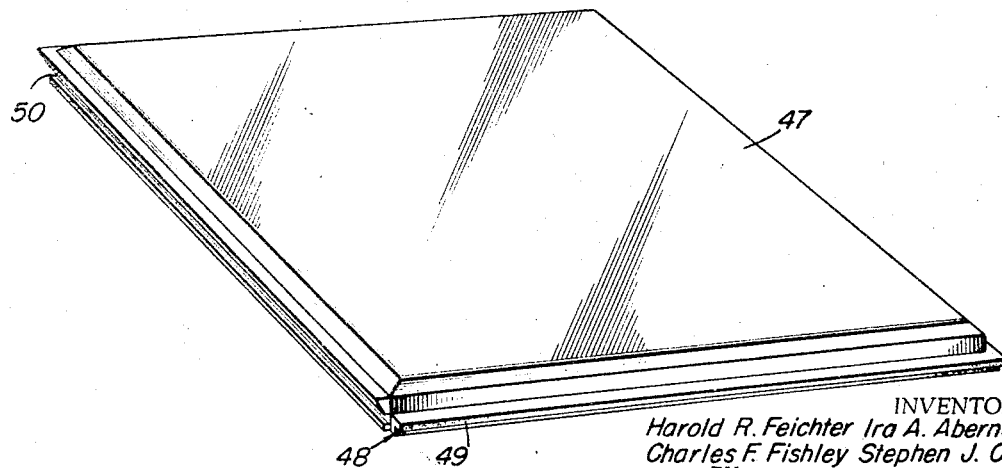

May 20, 1969  H. R. FEICHTER ET AL  3,444,660
PRE-GROUTED CERAMIC TILE ASSEMBLIES
Filed Sept. 1, 1966  Sheet 5 of 8
*FIG. 13C*
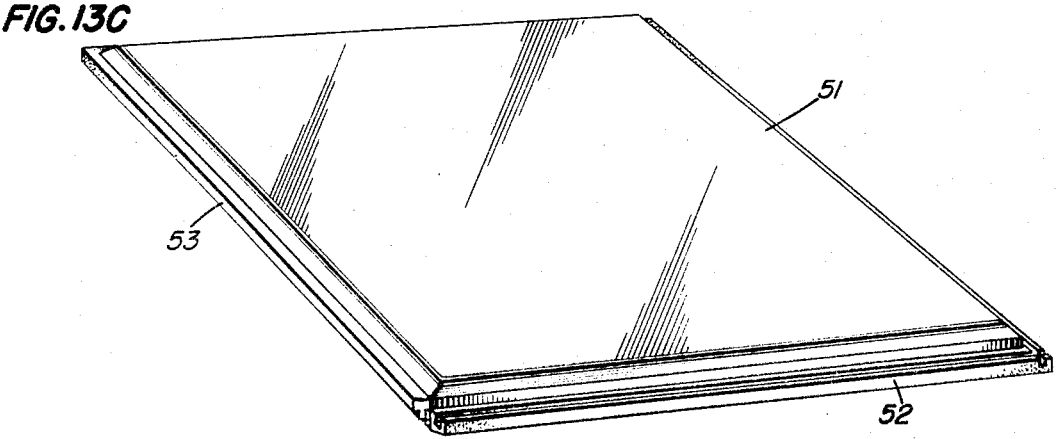
*FIG. 14* 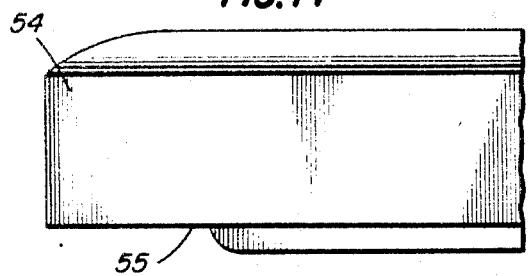 *FIG. 14A* 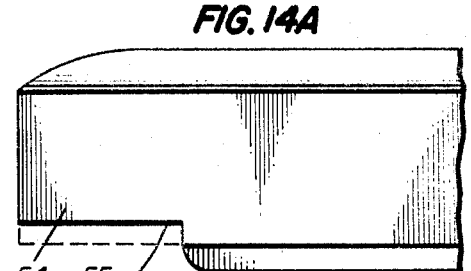
*FIG. 14B* 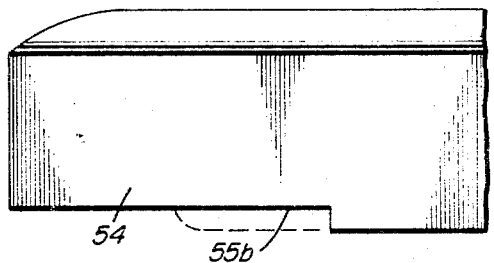 *FIG. 14C* 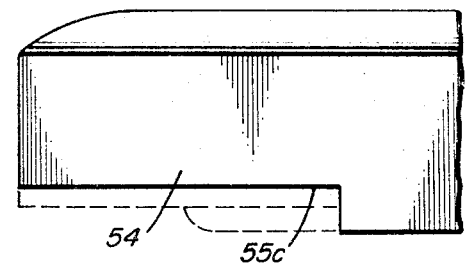
*FIG. 15* 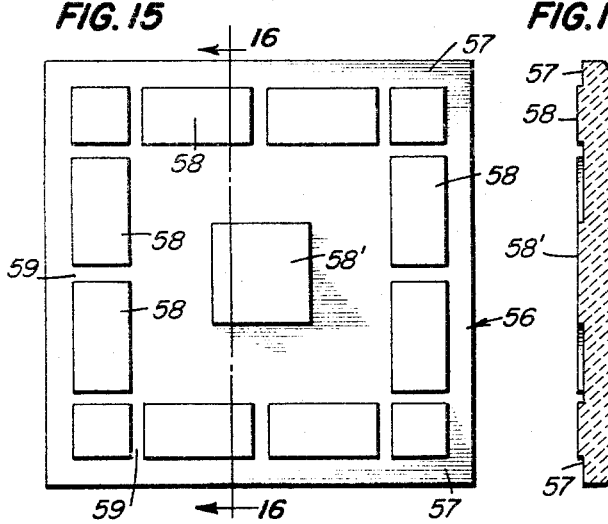 *FIG. 16*
INVENTORS
Harold R. Feichter   Ira A. Abernethy
Charles F. Fishley   Stephen J. Cable
BY        Olin M. Hoffman
ATTORNEY

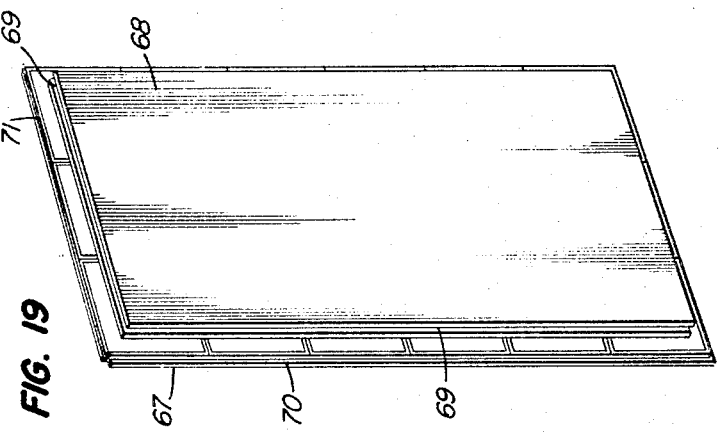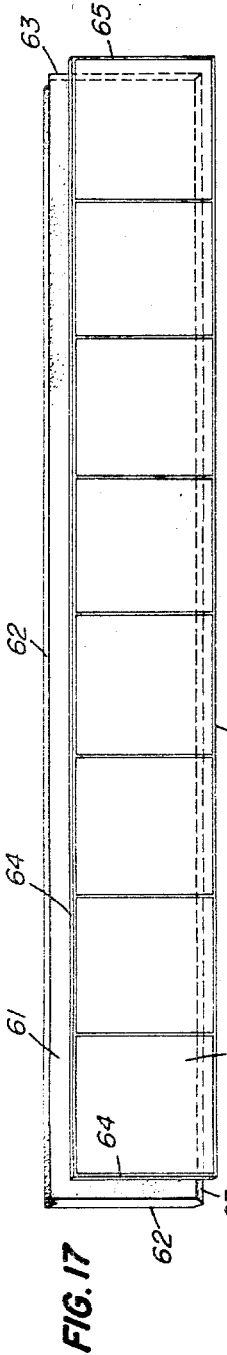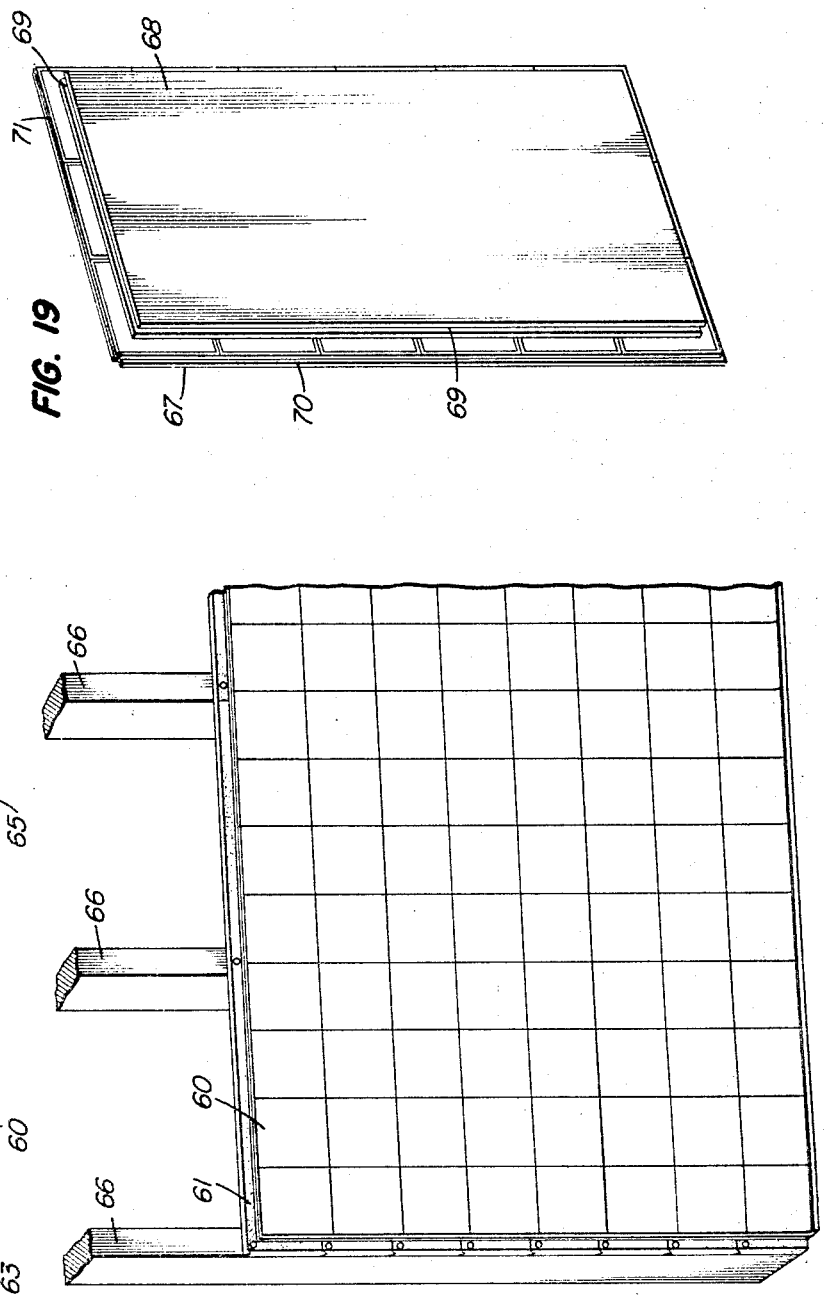

INVENTORS
HAROLD R. FEICHTER
IRA A. ABERNETHY
CHARLES F. FISHLEY
STEPHEN J. CABLE
OLIN M. HOFFMAN

BY Bartholomew Diggins
ATTORNEY

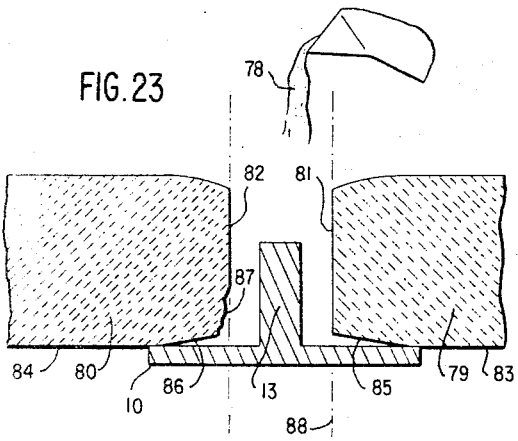
FIG. 23
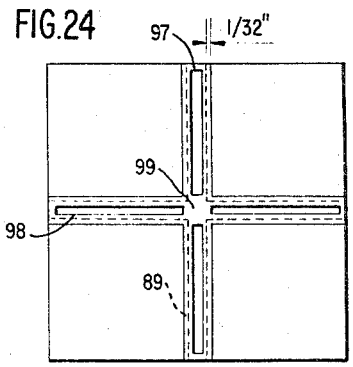
FIG. 24
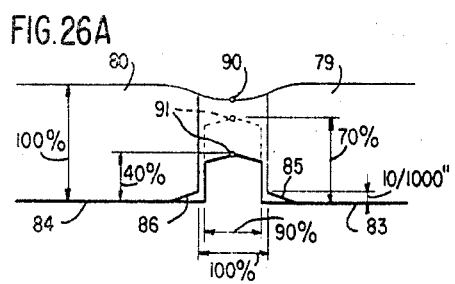
FIG. 26A
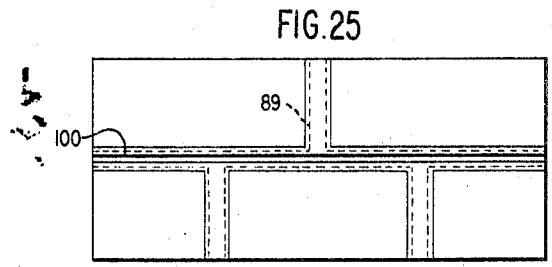
FIG. 25
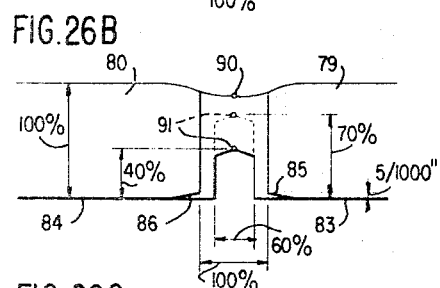
FIG. 26B
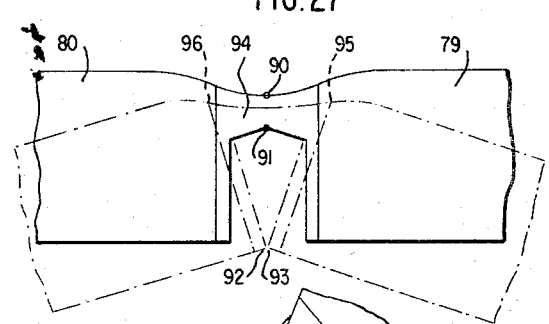
FIG. 27
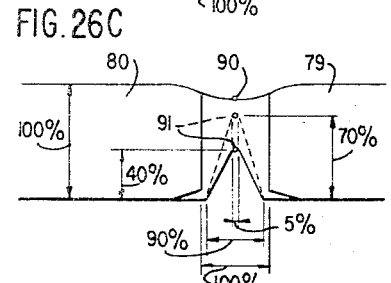
FIG. 26C
FIG. 26D
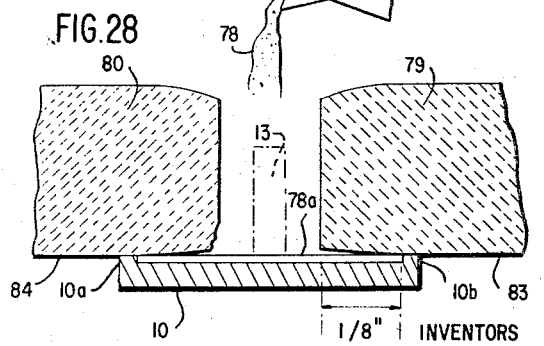
FIG. 28
INVENTORS
HAROLD R. FEICHTER, IRA A. ABERNETHY,
CHARLES F. FISHLEY, STEPHEN J. CABLE,
OLIN M. HOFFMAN
BY Bartholomew Diggins
ATTORNEY

United States Patent Office 3,444,660
Patented May 20, 1969

3,444,660
PRE-GROUTED CERAMIC TILE ASSEMBLIES
Harold R. Feichter, Canton, Ira A. Abernethy, North Canton, Charles F. Fishley, Mineral City, Stephen J. Cable, Canton, and Olin M. Hoffman, Massillon, Ohio, assignors to United States Ceramic Tile Company, Canton, Ohio, a corporation of Delaware
Continuation-in-part of application Ser. No. 224,817, Sept. 19, 1962. This application Sept. 1, 1966, Ser. No. 589,148
Int. Cl. E04c 1/24; E04f 13/08; E04h 14/00
U.S. Cl. 52—309                                    15 Claims

ABSTRACT OF THE DISCLOSURE

The disclosure is directed to ceramic tiles and tile assemblies provided with an improved grout structure. The grouting material is prefabricated in conjunction with the tile and is provided with a configuration to permit mechanical interlocking between the tiles. The grouting material is provided in the rear face thereof with elongated grooves which increases the flexibility of the grout joint while reducing the tensile stress on the grout to tile bond during flexure.

---

This application is a continuation-in-part of Ser. No. 224,817, filed Sept. 19, 1962, now abandoned.

This invention relates to ceramic tile, ceramic tile assemblies, and structural units of ceramic tile generally, and more particularly to ceramic tiles and tile assemblies provided with an improved grout structure.

Ceramic tiles may be employed for many construction purposes, for such tiles are highly resistive to wear and deterioration and are easily cleaned and maintained. These tiles are not only attractive in appearance, but further provide a water-proof and vermin-proof surface which is superior to that of other construction or surfacing materials.

One of the principal deterrents to the universal use and application of ceramic tiles for construction purposes has been the cost of installation. Until recently, the only satisfactory way of installing ceramic tiles was by manual application of one tile at a time to the surface to be tiled. In such installation, cementitious material grouting is applied between adjacent tiles. In order to produce a tile wall or floor with a finished appearance, the grout lines between tiles should be of uniform thickness so that the entire tile surface presents a uniform aspect. However, in manual tile setting it requires a high degree of mechanical skill on the part of the tile setter to accomplish uniform grouting. Hand grouting requires that the tile spacing be maintained uniform, that there be a uniform application of the grouting material, and that all excess grouting material be cleaned from the tile surfaces. The time, skill, and expense involved in an adequate grouting job is not only substantial, but also puts ceramic tile installation beyond the ability of the so-called "do it yourself handyman."

In an attempt to avoid the various difficulties and disadvantages referred to, the tile industry has continuously attempted to improve tile grouting, tile assemblies, and tile installation methods. The history of these developments may be ascertained by following the corresponding patent developments relating to improved ceramic tile structures and methods. For example, U.S. Patent No. 2,114,710 to Holcomb, discloses a rubber or rubber-like grid which is nailed or fastened to a grill, floor, or other surface, and individual tiles are then placed in the grid. U.S. Patent No. 2,266,510 to Pottinger, is one of a series of patents along the same general line involving a nailable rigid backing member to which ceramic tiles are secured; the backing member being adapted to be nailed or otherwise secured to a wall or floor.

Assemblies of the type illustrated by the Holcomb and Pottinger patents provided some advantages over the previously employed hand methods of setting tile. For example, the assembly illustrated by the Holcomb patent has a uniform grout line and, to some extent, simplifies the installation of the tile surface. However, with this assembly it is still necessary to set or insert the individual tiles by hand into the rubber grid after the grid has been secured to a wall, floor, or other surface.

Other disadvantages occur with respect to multi-ceramic tile panels which are formed with a support backing material for the panel as shown by the Pottinger patent. In the case of the Pottinger structure, there is no waterproof bonding between the tile's edges of adjacent assemblies and water can seep between adjacent tile surfaces causing rotting and deterioration of the sub-surface. In some instances when a backing material is employed, all joints between the tile are filled with portland cement or similar grout material. Panels constructed in accordance with such procedures are rigid, heavy, fragile, and extremely difficult to handle and install. When the resultant rigid structural units are placed upon a sub-surface, air is commonly trapped in bubbles at the back of the sheet and, due to the expansion and contraction of air as a result of temperature changes, individual tiles or even the entire tile sheet assembly may be dislodged from the wall, floor, or other support surface.

Subsequent innovations in the ceramic tile field resulted in the provision of lighter weight, more flexible tile panels, and French Patent No. 1,205,961 to Hartlmair disclosed the concept of edge bonding ceramic tiles by pouring resinous material between the tiles. To achieve even greater flexibility with light weight, U.S. Patent No. 2,852,932 to Cable illustrated a tile assembly wherein a plurality of tiles are mounted in a rubber grid-work which has side walls to define pockets which receive the tile. This grid-work is open to facilitate the exposure of a large area of the back side of each tile so that the tiles may be directly secured to a supporting surface by a suitable adhesive. This grout free exposure of a substantial area of the back side of each tile in the assembly permitted the assembly to be secured to a supporting surface by conventional tile adhesives which would adhere only to the tile, thus achieving a tile to support bond as well as a tile to grid bond. Additionally, the soft pad normally formed beneath the tile by a flexible backing sheet was substantially eliminated, and the non-flexible tile support provided by the portland cement or conventional tile adhesive employed to bond the assembly helped to prevent cracks and chips in the tiles which tend to occur in flexibly backed tile assemblies under heavy service.

A more recent innovation in the pre-assembly of individual tiles is illustrated by U.S. Patent No. 3,239,981 to Fitzgerald which relates to a tile assembly structure incorporating the combined concepts of edge binding of tiles while maintaining a grout free exposure of the backside of each tile in the assembly. The tile panels constructed in accordance with the Fitzgerald patent consist of a plurality of ceramic tiles edge bonded by a lattice of adhesive, resinous grouting material. The surfaces of the panel are free of grouting or backing material so that the panel can be adhered directly to a supporting surface as a pre-grouted unit. The adhesive grout employed to edge bond the tiles is, preferably, a flexible adhesive grout to impart flexibility to the tile assembly.

From this brief analysis of the progression of patents culminating in the development of the Fitzgerald patent, it is apparent that the tile industry has progressed from the manual grouting of individual tiles to a pre-assembled, flexible, light weight tile assembly. This progression has occurred in a step-by-step manner, with each new step eliminating deficiencies in the previously developed structures. It is the purpose of the present invention to continue this progression, and thereby add another development to the tile art.

In unitary ceramic tile panels wherein a plurality of individual ceramic tiles are bonded together solely at the edges thereof by a lattice of flexible bonding material, the elimination of support backing material results in the application of stress to the grout-edge bond under many use conditions. When such tile assemblies are rolled for shipment or installed upon irregular surfaces, the stresses applied to the grout joint tend to strip the grout from the tile edge.

Furthermore, in the formation of a unitary tile panel consisting of a plurality of ceramic tiles, the strict adherence to the principle of bonding adjacent ceramic tiles solely at their edges while maintaining the top and bottom surfaces of the tiles completely free of adhesive grout gives rise to production difficulties and resultant defects in the finished tile panel. Normally, in the construction of such panels, the adhesive grouting material is poured or otherwise injected into the spaces between adjacent tiles. If it could be assumed that the tiles composing the tile panel are exactly uniform in size and contain no chips, cracks or other irregularities, it would be possible to adhere to a principle of joining adjacent tiles strictly by edge-bonding. In actuality, however, it must be appreciated that ceramic tile is a product while is extremely difficult to manufacture to close tolerances. Slight variations in water content, uniformity, clay properties, or the like will cause dimensional variations during the firing of the tile. Thus, no matter how accurately a blank may be formed before firing, the dimensions will change in the kiln so that even the production of a substantially accurate, straight, flat edge requires a grinding operation. Also, additional irregularities are caused during shipping and during grinding of the tiles, so that it is impossible to produce tiles conforming exactly to one another. With these inherent tile irregularities, liquid adhesive poured between adjacent tiles in a manner to insure that the adhesive will contact and bond to only the edges of these tiles, contacts open tile irregularities and a great portion of the adhesive flows through the irregularities. Thus, a defective grout joint results.

Finally, installation difficulties are often encountered with edge bonded tile panels having grouting joints which completely fill the space between the upper and lower faces of the individual ceramic tiles. These installation problems are caused by the so-called "roll-up" of adhesive, which often occurs when individual tiles or panels are moved across a sub-surface coated with adhesive to bring such tile or panel into abutting relationship with an adjacent tile or panel. This sliding of the panel into the desired abutting relationship will often cause the adhesive on the sub-surface to "roll-up" or accumulate between adjacent panels, thereby precluding uniform spacing.

A primary object of this invention is to provide an improved interlocking pre-grouted ceramic tile sheet.

Another object of this invention is to provide an improved pre-grouted ceramic tile sheet having flexible inter-locking means for mechanically locking adjoining sheets together to form a pre-grouted peripheral joint.

A further object of this invention is to provide an improved pre-grouted ceramic tile or tile sheet having means for preventing adhesive "build-up" between tiles and/or tile sheets, when such tiles or sheets are brought into interlocking abutment over an adhesive coated surface.

Another object of this invention is to provide an improved pre-grouted ceramic tile sheet having grout joints between the individual tiles of the sheet designed to achieve greater joint flexibility and to relieve tensile stress on the bond between the grout joint and the edges of the tiles when the sheet is bent in flexure.

A further object of this invention is to provide improved inter-locking, pre-grouted tile sheets capable of being edge locked together to form a multiple sheet assembly with a water proof seal between joints.

Another object of this invention is to provide an improved pre-grouted ceramic tile sheet including grout joints between individual tiles designed to achieve greater joint flexibility and to relieve tensile stress on the bond between the grout joint and the edges of the tiles when the sheet is bent in flexure and also including a flexible inter-locking means secured to the peripheral edges of the said sheet for mechanically locking adjoining sheets together.

A still further object of this invention is to provide an improved pre-grouted ceramic tile sheet having improved, flexible grout joints wherein the grouting material is bonded to the edges of adjacent tiles but extends slightly over the peripheral edges of the back surface of the tiles to seal minor flaws, irregularities, and other defects in the tile edge.

The foregoing and other objects of the invention will become apparent upon a consideration of the following specification and appended claims, taken in conjunction with the accompanying drawings in which:

FIGURE 1 is a perspective view of a sheet of pre-grouted tiles having improved peripheral edge locking configurations and grout joints according to the present invention;

FIGURE 2 is a sectional view on line 2—2 of FIGURE 1;

FIGURE 3 is a fragmentary sectional view showing the interlocking edges of tile sheets of the type shown in FIGURE 1, locked in abutting position;

FIGURE 4 is a fragmentary sectional detail view of an interlocking tongue and groove grout joint between adjoining sheets of tile contoured to conform to the edges of the tiles;

FIGURE 5 is a fragmentary sectional detail view of a contoured grout joint between adjacent tiles of the sheet assembly of FIGURE 1;

FIGURE 6 is a perspective view of a sheet of tiles having a modified form of interlocking edge configuration;

FIGURE 7 is a sectional view on line 7—7 of FIGURE 6;

FIGURE 8 is a perspective view of a sheet of tiles showing another modification of interlocking edge configuration;

FIGURE 9 is a sectional view on line 9—9 of FIGURE 8;

FIGURE 10 is a fragmentary sectional view showing the interlocking edges of tile sheets shown in FIGURE 8, locked in abutting position;

FIGURE 11 is a fragmentary plan view of adjacent corner portions of four tile sheets or strips showing a further modification of interlocking edge configuration;

FIGURE 12 is an enlarged sectional detail view, showing the interlocking edge elements of the tile sheets or strips of FIGURE 11;

Figure 20:
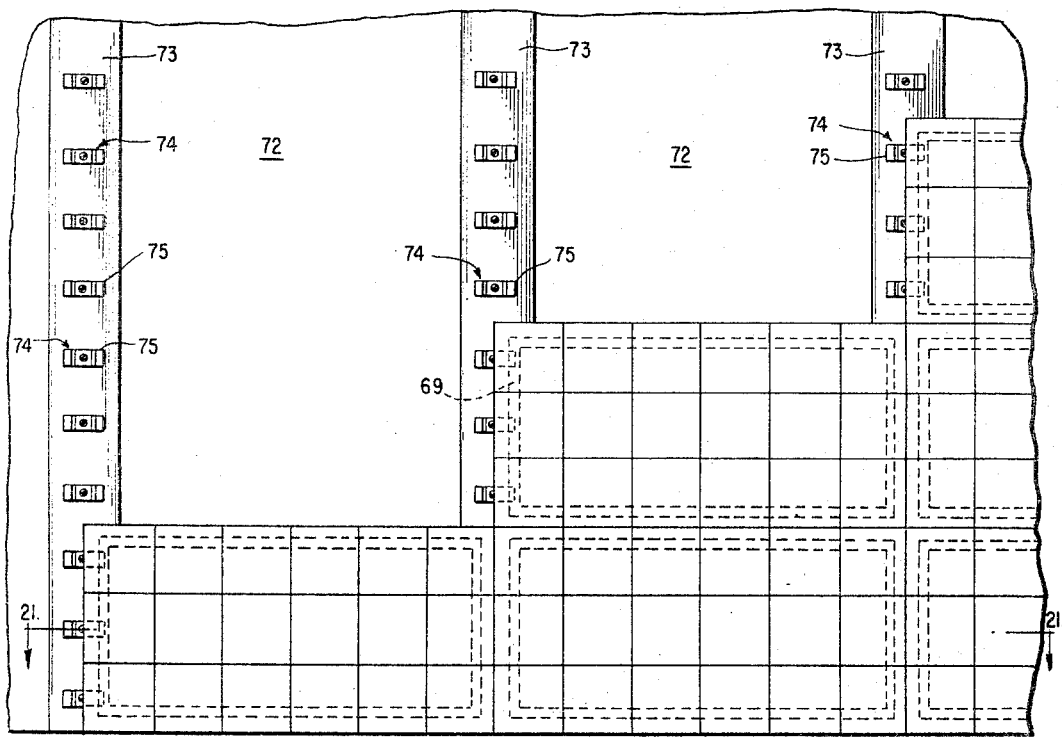
Figure 21:
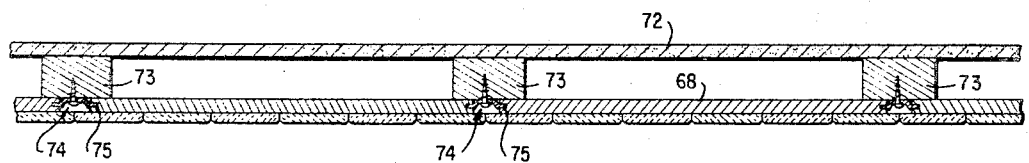
Figure 22:
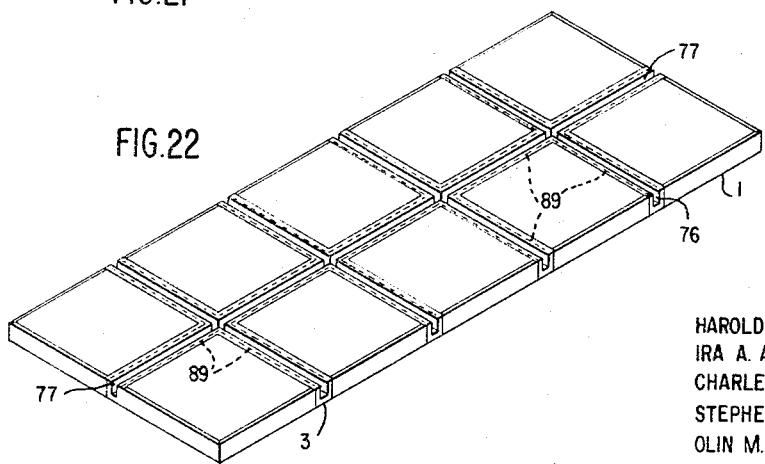

FIGURES 13, 13a, 13b, and 13c are perspective views of single tiles having interlocking edge configurations similar to those of the tile strips or sheets shown in FIGURES 1, 6, 8 and 11, respectively;

FIGURE 14 is a fragmentary view of a portion of the peripheral back edge of a pre-grouted tile or sheet, recessed to prevent build-up of bonding mortar or adhesive when positioning the tiles or sheets on a coated backing surface;

FIGURES 14a, 14b and 14c are fragmentary views similar to FIGURE 14, showing modified recessing arrangements;

FIGURE 15 is a plan view of the rear face of a ceramic wall tile showing a modified recessed arrangement to prevent roll-up of adhesive;

FIGURE 16 is a sectional view along line 16—16 of FIGURE 15;

FIGURE 17 is a perspective view of a pre-grouted strip of tiles prefabricated to a backing member;

FIGURE 18 is a perspective view, showing a portion of a surface formed from offset strips of the type shown in FIGURE 17, installed on studding of a wall partition;

FIGURE 19 is a perspective view of a pre-grouted tongue and groove sheet of tiles bonded to a recessed edge-grooved backing member;

FIGURE 20 is a front elevational view showing prefabricated, pre-grouted tile sheets of the type shown in FIGURE 19 installed on a surface structure;

FIGURE 21 is a sectional view along line 21—21 of FIGURE 20;

FIGURE 22 is a persepctive view of the bottom surface of a portion of the tile sheet of FIGURE 1;

FIGURE 23 illustrates the method for forming the grout joint of the present invention;

FIGURE 24 is a plan view of the bottom of a tile panel section including an embodiment of the grout joint of the present invention;

FIGURE 25 is a plan view of the bottom of a tile panel section formed from tiles of varying size which includes the grout joint of the present invention;

FIGURES 26a, b, c, and d illustrates the dimensional limits for the grout joint of the present invention;

FIGURE 27 is a diagrammatic illustration of the grout joint of the present invention in flexture; and FIGURE 28 illustrates a method for forming the grout joint of the present invention.

Referring to the drawings, and more particularly to FIGS. 1–3, there is shown a pre-grouted tile sheet 1, made up of a plurality of tiles 2, bonded together with flexible pre-grouted joints 3. The peripheral edge portions of the sheet 1 are provided with flexible plastic elements 4 bonded thereto which are adapted for mating interlocking engagement with complementary elements bonded to the peripheral edge portions of adjoining sheets. These plastic elements 4, several embodiments of which will be subsequently described in detail, operate to mechanically lock adjoining sheets 1 together in close abutment, thus providing intervening grouted joints between sheets.

In the embodiment of the invention shown in FIGS. 1–3, the configuration of each of the flexible interlocking elements 4 bonded to the edge portions of the sheet 1 is in either the form of a groove 5 or in the form of a tongue 6. In connection with the design and formation of these flexible interlocking elements 4, members 5 and 6 are preferably formed from thermoplastic polyvinyl chloride plastisol with a compatible bonding primer, either self-contained in the plastisol or previously applied to the tile surfaces constituting the peripheral edges of the sheet 1. It will be observed in FIGS. 2 and 3, that the grooves 5 are defined by spaced flanges 7 designed to receive a tongue member 6 therebetween. It will be further observed that the groove entrant 8, is of such configuration to permit ready insertion of the tongue member, and by reason of the curvature and the angularly disposed surfaces of the compressible resilient locking members 4, the sheets are mechanically locked together. As will be seen in FIG. 3, upon compression of the top flange portion of a grooved edge of the sheet, the flange is conformed to the curvature of the cushion edges of the tiles of adjoining sheets, which displacement of the flange results in a grip-lock on the tongue. Also, the flange contacting upper and lower surfaces of the tongue 6 may be angled outwardly from the juncture of the tongue with the supporting tile edge, while the corresponding tongue contacting surfaces of the flange 7 may be angled in a complementary manner to increase the lock-in action. It will be appreciated that the multiple tile sheets and multiple tile strips of any desired number of tiles may be employed and provided with the locking members 4 in accordance with the present invention.

As will be seen in FIGURE 4, which is a sectional detail view of an interlocking tongue and groove joint between adjoining sheets of tile, the joint is contoured to conform to the curvature of the cushion edge of the adjoining tile sheet. The conformation of the joint to the curvature of the adjoining top edge of the tile may be accomplished by means of a mold gasket 9, in conjunction with the mold gasket 10 at the bottom of the joint.

In FIGURE 5 the grout joint between tiles within a sheet assembly is contoured in the same fashion as the joint between tile sheets, and additionally, a grooved recess 11 is formed in the back of the grout joint for the purpose of increasing the flexibility of the joint and to reduce tensile stress. This grooved recess may be formed in the grouting material 12 by means of a divider strip 13 which is part of the mold apparatus, not shown. The novel function and structural configuration of the grooved recess 11, as employed with the ceramic tile sheet, of FIG. 1, will subsequently be dealt with in greater detail.

In FIGS. 6 and 7, there is shown another modification of the interlocking edge element 4 in which the interlocking elements of the tile sheet are of a tongue and groove type split joint. As will be seen in FIG. 7, the groove element 14 of the sheet 15 comprises top and bottom flanges 16 and 17, the contour of the grout 17' of the bottom flange being established by means of a metal form 18, an end portion of which is shown in dotted lines, and separated from the groove edge of the sheet for purposes of clarity. It will be observed that the tongue element 19 is formed with a lip or flange 20 adapted for insertion in the groove 14 defined by the upper and lower flanges 16 and 17. A portion of the groove edge of a mating sheet 15' is shown apart from the tongue edge of sheet 15.

Reference being had to FIGS. 8–10, there is shown a tile sheet 21 having a further modified form of the interlocking edge element 4, wherein the tongue member 22 bonded to the edges of the boundary tiles 23 is formed with a lip or flange 24 of rectangular cross-section, adapted to seat in a slot 25 formed in the associated locking element 26 bonded to the edges of the boundary tiles 23' of an adjoining sheet 21'. By reason of the construction and arrangement of the flexible plastic locking elements 22 and 25, an improved sheet joint seal is provided which forms a barrier against moisture penetration, since it prevents backup wall dampness and deterioration of the adhesive bond. Additionally, due to the fine adherence between adjoining sheets, separation is prevented and the joint improves the appearance of a sheet assembly, since it eliminates lodging places for dust, dirt, or other foreign materials.

In FIGS. 11 and 12, there is shown a still further modification of interlocking edge element 4, wherein the grooved locking edges 26 bonded to the lower section of the peripheral edges of adjoining boundary tiles 27 and 28 of the sheets 29 and 30, are conformed, as shown, to receive the tongue elements 31 projecting from a locking edge 31' bonded to the upper peripheral portions of the boundary tiles 32 and 33 of adjoining sheets 34 and 35. Instead of the locking tongue projecting into a locking groove formed by two spaced flanges and the peripheral edge surface of the flange supporting tiles, as previously illustrated, the tongue 31 and a groove 26' therefor extend in a plane substantially parallel to the peripheral edges of the tiles 27, 28, 32, and 33 which support them.

The grouting material should be flexible, resilient and impervious to water and other fluids which might come into contact with the tiled surface. A wide variety of natural and synthetic elastomers which meet the requirements of the present invention are well known to the chemical industry. In connection with the above described tile assemblies, either in sheet or strip form, it is to be understood that the present invention comprehends the use of resilient grouting alone along the tile edges or a resilient backing sheet to provide a cushion between the sheet or strip and the underlying surface, or a rigid backing member formed from paperboard, plywood, wood or the like, as will be described more fully hereinafter. It will be further understood that, in all of the various modifications of the present invention, the flexible plastic material is applied to the edges of the tile sheets, and between tiles, at the factory, to provide pre-grouting and interlocking edges of the type described hereinabove.

Referring to FIGURES 13, 13a, 13b, and 13c, single tiles are shown having interlocking edge configurations similar to those of the tile sheets shown in FIGURES 1, 6, 8 and 11, respectively, and the description given in connection with these figures is applicable to FIGURES 13, 13a, 13b, and 13c. In FIGURE 13 there is shown a tile 36 having flexible plastic peripheral edge portions 37, 38, 37' and 38' for mating interlocking engagement with complementary elements associated with peripheral edge portions of adjoining tiles, whereby to mechanically lock the tiles together in close abutment, thus providing intervening grouted joints therebetween.

In the embodiment of the invention shown in FIG. 13, the configuration of the edge portions 37, 38 is in the form of a groove 39, and the configuration edge portions 37', 38' is in the form of a tongue 40.

In the embodiment of the invention in FIGURE 13a, the peripheral edges of a tile 41 comprise a groove 42 formed by top and bottom flanges 43 and 44 and a tongue 45 formed with a lip or flange 46 adapted for insertion in the groove 42 of an adjacent tile.

Reference being had to FIGURE 13b, there is shown a tile 47 having an interlocking edge configuration, wherein the tongue member 48 bonded to the edges of the tile is formed with a lip or flange 49 of rectangular cross-section, adapted to seat in a slot 50 formed in the associated locking element of an adjoining tile.

In FIGURE 13c, there is shown a tile 51 having a grooved edge 52 bonded to the lower peripheral portion of two edges of the tile and a tongue element 53 bonded to the upper peripheral portions of the other two edges of the tile.

By the construction and arrangement of the individual tiles having the edge configurations as described above with regard to FIGURES 13, 13a, 13b and 13c, the individual tiles can be easily removed from or added to a tile sheet when installing the tiles.

In FIGURE 14, there is shown a peripheral back edge of a tile sheet 54 provided with a recess 55. By providing the tile with a recess the so-called "roll-up" of adhesive or the accumulation of adhesive between adjacent tile sheets when sliding the sheets into desired abutting relationship is precluded.

The embodiment of the recessed tile sheets shown in FIGURES 14a, 14b and 14c are similar to that shown in FIGURE 14 but with the size of the recesses 55a, 55b and 55c, respectively, increased by removing a portion of the tile and sheet edge as indicated by the dotted lines.

In FIGURES 15 and 16 a cerimac tile 56 is shown having a recessed portion 57 on the periprehal back edge and surface of the tile, the tile being provided with a plurality of suitably arranged embossments 58 to form vents 59 therebetween. By this construction and arrangement, the effect of adhesive "roll-up" is not only minimized, but the warpage of the tile is controlled. For the purpose of controlling tile sag, during firing, the central embossment 58' is made slightly higher than the embossment 58, and the upper surface thereof is convex after firing.

In order to facilitate installation of a pre-grouted tile strip having a backing member, the invention contemplates prefabricating a tile strip to a specially constructed backing member. Accordingly, in FIGURE 17 there is shown a pre-grouted tile strip 60 diagonally offset from a backing sheet 61 of gypsum board or plywood or the like, and secured thereto by a suitable adhesive. The backing strip 61 is provided with grooves 62 on two adjacent edges and tongue members 63 on the other two edges which are adapted to engage a similarly shaped backing strip during installation. The pre-grouted tile strip is also provided with grooves 64 on two adjacent edges and tongue member 65 on the other two edges adapted to interlock with correspondingly shaped edges on an abutting pre-grouted tile sheet. The tongues and grooves used in the tile strip and backing sheet are of the types described above and illustrated in FIGURES 1 to 12.

FIGURE 18 shows a portion of a wall surface formed from the offset strips 60 and 61 of the type shown in FIGURE 17 installed on studding 66 of a wall partition.

A further modification of a prefabricated, pre-grouted tile assembly is illustrated in FIGURE 19 wherein a pre-grouted tile sheet 67 is bonded to a backing sheet 68 of plywood or gypsum board recessed from the peripheral edges of the tile sheet. The edges of the backing sheet 68 are provided with grooves 69 and the tile sheet is provided with tongue members 70 and grooves 71 of the type illustrated in FIGS. 1 to 12.

FIGURES 20 and 21 illustrate the manner in which the prefabricated, pre-grouted tile sheets of the type shown in FIGURE 19 are installed on a surface structure 72. As will be seen, wood studding or furring strips 73 are secured to the surface structure 72. Metal fastening strips or clips 74 having projections 75 are secured to the studding so that when mounting the tile sheets on the studding, the projections 75 are inserted into the grooves 69 formed in the backing sheet 68.

Although a pre-grouted tile sheet has been described as being fabricated to a backing member of plywood or gypsum board, the invention also contemplates the fabricating of a pre-grouted tile sheet to a resilient backing member or the use of the sheet with no backing member at all.

It is often desirable to employ the tile sheet of FIG. 1 without backing material of any sort, and to bond this tile sheet directly to a supporting surface with suitable adhesive. For such purposes, ceramic tile adhesive spread upon the supporting surface bond directly to the back surfaces of the individual ceramic tiles making up the tile sheet to hold the tile sheet in place. Often, the supporting surface is somewhat irregular, and therefore it is advantageous to provide a tile sheet or panel which is capable of flexure so that the panel will cover an irregular surface. Also, panels of this nature may be rolled for shipping and, if desirable, may be installed o na curved surface.

Referring now to FIG. 22, it will be noted that when the tile sheet 1 of FIG. 1 is turned over, substantially parallel grooved recesses 76 and 77 extending longitudinally and laterally across the tile sheet are exposed. These grooved recesses or grooves are formed in the back of the flexible grout joint 3 approximately midway between the edges of the adjacent tiles, and extend into the grout joint for a substantial distance.

The process for forming the grout joint 3 and the specific structural configuration of the joint may best be understood by referring to FIGS. 22, 23, and 26a–d. The joint is formed from flexible grouting material which is preferably elastomeric in nature and serves the function of the mortar or cement grout previously used in ceramic tile assemblies. This flexible grouting material must be adhesive in nature, for it is the bond between theg rout joint and adjacent tiles which holds the tile sheet together.

To form the tile panel of this invention, a plurality of ceramics tiles are arranged in edge-to-edge relationship and relatively spaced so that substantially aligned edges of adjacent tiles form a plurality of substantially straight, parallel lines with the aligned edges of spaced opposing tiles. These parallel lines between tiles must extend in at least one direction across the tile sheet, and, preferably, as illustrated in FIG. 22, extend both laterally and longitudinally across the tile sheet. It is along these substantially parallel lines between adjacent tiles that the grout joint of the present invention will be formed.

In the formation of the grout joint, a process somewhat similar to that diagrammatically illustrated in FIG. 5 is employed. The mold gasket 10 may constitute many known molding diaphragms or similar mold elements. The flexible adhesive grouting material 78 is injected, by any suitable method known to the prior art, into the spaces between the individual ceramic tiles composing the tile panel. As shown in FIG. 23 this grouting, material may not be permitted to completely fill the space between adjacent tiles 79 and 80, for, as indicated in connection with the description relating to FIG. 5, a divider strip 13 can be provided to form a grooved recess in the back of the grout joint. This divider may extend completely across the panel, or may constitute a number of interrupted divider sections in order to form the recess configuration to be subsequently described.

Although the adhesive grounting material 78 is bonded to the edge surfaces 81 and 82 of adjacent tiles 79 and 80, this grouting material also preferably extends beyond the peripheral edges of the back surfaces 83 and 84 of the tiles to enclose the peripheral edges of these back surfaces. The back surfaces of the tiles 79 and 80 may be beveled inwardly adjacent the peripheral edges thereof as indicated at 85 and 86, and it is this beveled portion of the back surface which is designed to receive some of the adhesive grouting material 78. Alternatively, as in FIG. 5, the bottom of the tile may be cutaway at the peripheral edges instead of beveled to form a seat for the grouting material bonded to the back of each tile.

The extension of the grout joint onto the peripheral portion of the back surface of the tiles forming the tile panel can be most important for often irregularities, such as that indicated at 87, exist in the edges of the spaced, adjacent tiles bordering the grout joint. If such irregularities exist and the bottom mold gasket 10 is positioned only between the dotted lines 88 in FIG. 23 so that the grouting material 78 would bond only to the edges 81 and 82 of the adjacent tiles, the grouting material would tend to flow out through the irregularity 87, and a defective grout joint would result. However, by positioning the bottom mold gasket 10 so that the peripheral edges of the back surface of the adjacent tiles are enclosed by a thin layer of grouting material, it will be noted that the irregularity 87 is sealed and a perfect grout joint results. Thus, when the tile sheet 1 of FIG. 22 is formed in the manner indicated by FIGS. 5 and 23, a small portion of the peripheral edges of the back of each individual tile is covered by grouting material, and the tile edge, indicated in dotted lines at 89, is enclosed.

Another method for forming the grout joint is illustrated in FIG. 28 wherein it will be noted that no beveled or cutaway section is provided in the back surface of the adjacent tiles 79 and 80. Instead, the bottom mold gasket 10 is formed with upwardly projecting ridges or ribs 10a and 10b which are spaced inwardly from the back peripheral edges of adjacent tiles and which run substantially parallel to the joint to be formed between the tiles. These ribs support the tiles so that a thin layer of grouting material may be formed which extends between the tiles and is bonded to the peripheral back surfaces thereof as illustrated at 78a in FIG. 28. Although this initial layer of grout is very thin, it can operate to bond the tiles in the tile sheet together before the major portion of the grouting material is applied to fill the remaining spaces between the tiles in the sheet.

The bottom mold gasket 10 having the ribs 10a and 10b may be employed with the beveled tiles of FIG. 23 or with tiles having a cutaway section on the peripheral back surface thereof as illustrated by FIG. 5. In most instances, it will be desirable to form a grooved recess in the back of the grout joint as previously described, and for this purpose the divider strip 13, shown in dotted lines in FIG. 28, is employed during the formation of the joint.

Preferably, the adhesive grouting layer formed on the peripheral back portions of each tile, as illustrated in FIGS. 23 and 28, is quite thin, $5/1000$ to $10/1000$ of an inch thick, and extends inwardly from the tile edge from $1/32$ to $1/8$ of an inch. However, an appreciable bond is formed between this grouting layer and the back surface of each tile and this bond is not subjected to the tensile stress present at the edge bond between the grout joint and the tile when the pre-grouted tile panel is flexed. For example, with an average square tile size of 1.0175 inches, when the grouting layer extends for $1/16$ of an inch onto the peripheral back surface of each tile in the panel, 23.1% of the back surface of each tile will be covered by grouting material. This adequately seals tile edge imperfections while enhancing the joint-tile bond.

The dimensions of the grooved recess formed in the back of the grout joint are of importance, for the recess must be deep enough to appreciably reduce the tensile stress on the bond between the tile edge and the grout joint while still maintaining strength in the grout joint. The dimensional ranges of this grooved recess are illustrated by FIGS. 26a–d wherein it will be noted that the depth of the grooved recess, when measured perpendicularly from the bottom surface of the tiles to the extremity of its closed end, must be at least 40% and no more than 70% of the maximum dimensional thickness of the adjacent tiles. The width of the grooved recess when measured across the grout joint between adjacent tiles at right angles to its longitudinal axis, must be, at its open end, at least 60% and no more than 90% of the full width of the joint between the tiles. This width, at the closed inner end of the grooved recess must be at least 5% and no more than 90% of the full width of the joint between the tiles.

The purpose of the dimensional ranges, which are illustrated in FIGS. 26a–d, will be best understood by a consideration of the purpose of the grooved recess and its operation as illustrated in FIG. 27. The grooved recess formed in the back of the grout joint between adjacent tiles, as herein described, places the axis of rotation of the joint, when bent to and fro in flexure, at a joint within the upper 60% of the grouted joint where the greater portion of the solid mass of the grouting material forming the joint is confined. With the majority of the grout mass so positioned, the grout in the upper section acts, when the joint is bent in flexure until the bottom ends of the open recess are closed, like the pintle of a swinging hinge. The grooved recess places the upper fulcrum indicated at 90 and the lower fulcrum 91, over which the movement of the joint operates in to and fro flexture, exclusively within the upper 60% of the joint. The upper fulcrum 90 is located axially at the top surface of the grouted joint and the lower fulcrum is located at the closed end of the grooved recess at a point at least 40% and no more than 70% above the bottom surface of the tiles.

Referring specifically to FIG. 27, it will be readily appreciated that when the tiles 79 and 80 are bent in flexure as illustrated, the lower corners 92 and 93 of the tiles are permitted to move together closing the open end of the grooved recess while the upper portion of the grout joint 94 acts similarly to the pintle of a hinge. By positioning the major portion of the grout joint 94 at a point 40% to 70% above the bottom surface of the tiles to provide an open grooved recess in the remainder of the grout, it will be noted that possibly as much as 40 to 70% of the force required to bend the joint in flexure before the bottom edges 92 and 93 come into contact is eliminated. Accordingly, this appreciably reduces the tensile stress imposed in flexure between the grout joint and the edge surfaces of the tile.

It is apparent that if the recess in the grout is not present, flexure in the manner indicated in FIG. 27 would cause the tile edges 92 and 93 to come together against solid grout, thereby placing this grout under pressure. Additionally, the lower fulcrum 91 instead of being in the upper portion of the grout joint as indicated in FIG. 27, would be at a point substantially in line with the bottom surfaces of the tiles and thus the forces at the bond points 95 and 96 between the joint and the tile would be high. These forces would be multiplied by the length of the fulcrum which, in the case of a grout joint having no groove, would be the dimensional thickness of the tile. Under a force of this intersity, the bond between the grout joint and the tile breaks and individual tiles are ejected from the grouting lattice.

The provision of a grooved recess having the specific dimensions described not only serves to increase the flexibility of the grout joint while reducing tensile stress on the joint-tile bond during flexture, but the recess also serves other very important purposes. This grooved recess reduces the weight and cost of grouting material employed in constructing the tile sheet, and thereby reduces both the weight and cost of each tile panel. Additionally, the grooved recess provides a guide which aids in accurately cutting tile sheets mid-way between the grout joints to produce half grout joints on the cut edge.

In the installation of a tile panel, the grooved recess in the back of the grout joint provides means for the escape of air from the back of the tile sheet when the sheet is laid in bonding adhesive. It also provides a key-way for anchoring the tile sheet in mortar or adhesive, thereby increasing the sheet to support surface bond. As the grooved recess increases the surface area on the back of the sheet, a greater bonding area is exposed to bonding adhesives and cements to enhance the sheet to support surface bond.

Referring now to FIGS. 24 and 25, several embodiments of tile sheets or assemblies employing the novel grooved grout joint construction of the present invention will be noted. In some instances, it may become desirable to increase the strength of the grooved grout joint in multi-tile assemblies. Additional strength may be imparted to the joint by limiting the length of the groove in the grout joint to a portion of the length of adjacent tiles, while employing a plurality of these short grooves coextensively across the panel. Thus, as illustrated in FIG. 24, the longitudinal and lateral grooves 97 and 98 are substantially equal in length to the corresponding sides of the adjacent tiles. This permits a grout build-up 99 at the juncture point between four adjacent tiles, and at this point, the grouting in the joint is substantially solid, completely filling the space. This grout joint construction provides a point of high strength at each tile juncture without substaintially increasing the tensile stress applied to the grout join-tile bonding points.

FIG. 25 illustrates a grout joint configuration which could be employed when tiles which are aligned along continuous grout joints in only one direction. This tile sheet configuration permits tiles of varying sizes to be employed in a sheet, and the flexture of the sheet is limited to flexture in only one direction; the direction of flexture permitted by the grout joint 100.

It will be apparent to one skilled in the art that the present invention provides a novel and improved tile or tile assembly having flexible interlocking means for effectively locking adjacent assemblies together. Additionally, the tile panels of the present invention include an elastomeric, flexible grouted joint with a grooved recess which increases the flexibility of the joint with the reduction of the tensile stress applied to the joint-tile bond during flexture. The specific construction of the grooved recess described provides means for using harder and higher durometer, less flexible grouting materials in a tile sheet while compensating for their lower flexibility. Also, the tile panels of the present invention provide tiles bonded together into an assembly by the extension of a portion of the grouting material over the peripheral back surfaces of adjacent tiles.

The arrangement and types of components utilized within this invention may be subject to numerous modifications well within the preview of the inventors who intend only to be limited to a liberal interpretation of the specification and appended claims.

What is claimed in:

1. A pre-grouted ceramic tile sheet suitable for packaging in rolls to facilitate shipment and adapted for installation on irregular surfaces comprising a plurality of ceramic tiles arranged in edge to edge relationship and relatively spaced so that substantially aligned edges of adjacent tiles form, with the aligned edges of spaced opposing tiles, a plurality of substantially straight, parallel lines extending in at least one direction across said tile sheet and pre-grouted joints extending between the edges of adjacent tiles, said pre-grouted joints being formed by flexible, adhesive grouting material bonded to the edges of said tiles, so that the bottom surfaces thereof are substantially exposed, each of the pre-grouted joints extending along said substantially straight, parallel lines having a grooved recess formed in one surface thereof midway between adjacent edges of opposed tiles, said grooved recess having an open end and a closed end and extending substantially across said tile sheet the depth of said recess being equal to at least 40% of the maximum dimensional thickness of said opposed tiles but no more than 70% thereof.

2. The pre-grouted ceramic tile sheet of claim 1 wherein the open end of said grooved recess is of a width equal to at least 60% and no more than 90% of the full width of said grooved pre-grouted joint and the closed end of said recess is a width less than that of said open end, said closed end being of a width no less than 5% of the full width of said pre-grouted joint.

3. The pre-grouted ceramic tile sheet of claim 1 wherein the open and closed ends of said grooved recess are of a width no greater than 90% of the full width of said pre-grouted joint, said open end being of a width no less than 60% of the full width of said pre-grouted joint and said closed end being of a width no less than 5% thereof.

4. The pre-grouted ceramic tile sheet of claim 1 wherein mechanical locking means are secured to the peripheral edges of said tile sheet for joining adjacent sheets together, said locking means including projecting tongue means and tongue receiving groove means operable to receive and clamp a tongue means from an adjacent tile sheet when said sheets are brought into abutment to lock said sheets together.

5. The pre-grouted ceramic tile sheet of claim 1 wherein said adhesive grouting material substantially encloses the entire bottom peripheral edges of said tiles.

6. A pre-grouted ceramic tile sheet suitable for packaging in rolls to facilitate shipment and adapted for installation on irregular surfaces comprising a plurality of ceramic tiles arranged in edge to edge relationship and relatively spaced so that substantially aligned edges of adjacent tiles form with the edges of spaced opposing tiles, a plurality of substantially straight, parallel lines extending in at least one direction across said tile sheet, and pre-grouted joints extending between the edges of adjacent tiles, said pre-grouted joints being formed by flexible adhesive grouting material bonded to the edges of said tiles so that the top and bottom surfaces thereof are substantially grout free and exposed, each of the pre-grouted joints extending along said substantially straight, parallel lines having a plurality of longitudinally spaced, grooves formed in one surface thereof and extending substantially throughout the length of such joints, said grooves being formed mid-way between adjacent edges of opposed tiles and having a depth equal to at least 40% and no more than 70% of the maixmum dimensional thickness of said opposed tiles.

7. The pre-grouted ceramic tile sheet of claim 6 wherein said grooves have an open end and a closed end the open end of each of said grooves is of a width equal to at least 60% and no more than 90% of the full width of said grooved pre-grouted joint and the closed end of said groove is of a width no less than 5% and no more than 90% of the full width of said grooved pre-grouted joint.

8. The pre-grouted ceramic tile sheet of claim 7 wherein said ceramic tiles are of substantially equal size and are arranged in aligned edge to edge relationship and relatively spaced, said plurality of longitudinally spaced grooves extending between the aligned edges of spaced opposing tiles and having a length substantially equal to the length of the edges of said opposing tiles.

9. A ceramic tile unit for installation on a support surface, said tile unit comprising ceramic tile means having grouting bonded to the peripheral edge portions thereof, said grouting being formed from resilient material, first portions of said grouting being formed with a tongue receiving groove having a closed end, an open entrant end and two spaced sidewalls extending between said open and closed ends, at least one of said sidewalls being inclined inwardly from the open end of said groove toward the closed end thereof to form said groove with a closed end which is wider than said open entrant end, and second portions of said grouting being formed with a projecting tongue having a lead end for insertion into a tongue receiving groove on an adjacent tile means and a trailing end, said tongue being formed complementary to said groove with the lead end being wider than the trailing end thereof and the open entrant end of said groove to facilitate inter-locking engagement with complementary grouting associated with the peripheral edge portions of an adjoining tile means, whereby the tile means may be mechanically locked together in close abutment to provide a grouted joint therebetween.

10. A ceramic tile unit as defined in claim 9 wherein said tile means includes a top surface, a back surface and peripheral edge surfaces extending therebetween, the peripheral edge portion of said back surface being provided with a recess to prevent accumulation of adhesive between adjacent tile means when sliding such tile means into abutting relationship.

11. The ceramic tilt unit of claim 9 wherein said tongue and tongue receiving groove extend in a plane substantially parallel to the peripheral edge portions of said tile means to which said grouting is bonded, said first and second grouting portions being bonded to opposed sections of the peripheral edge portions of said tile means whereby said tongue is enabled to mate with a complementary groove formed on adjacent tile means.

12. A ceramic tile unit for installation on a surface, said tile unit comprising tile means having a top surface, a bottom surface and peripheral edge surfaces extending therebetween, said tile means having synthetic resin grouting bonded to its peripheral edge surfaces, the grouting having a tongue and groove configuration adapted for inter-locking engagement with complementary grouting associated with peripheral edge portions of an adjoining tile means whereby the tile means may be mechanically locked together in close abutment, thereby providing grouted joints therebetween; said groove including two spaced flanges forming the sidewalls of said groove with the peripheral edge surface of the tile means between the spaced flanges forming the bottom of said groove, a surface of at least one flange of said pair of flanges being inclined inwardly towards said peripheral edge surface and the bottom surface of the tile means; said tongue being complementary to like grooves.

13. A ceramic tilt unit as defined in claim 12 wherein said tongue portion is formed with a lip of rectangular cross-section.

14. A pre-grouted ceramic tile sheet suitable for packing in rolls to facilitate shipment and adapted for installation on irregular surfaces comprising a plurality of ceramic tiles arranged in edge to edge relationship and relatively spaced so that substantially aligned edges of adjacent tiles form, with the aligned edges of spaced opposing tiles, a plurality of substantially straight, parallel lines extending in at least one direction across said tile sheet and pre-grouted joints extending between the edges of adjacent tiles, said pre-grouted joints being formed by flexible adhesive grouting material bonded to the edges of said tiles and extending in a thin layer over the peripheral portions on the bottom of each said tile, whereby the entire bottom peripheral edge of each said tile is substantially enclosed in grouting material while a substantial portion of the bottom surface thereof is exposed, wherein said grouting material layer on the bottom of each tile extends inwardly from the peripheral edge of the tile for a distance within the range of $\frac{1}{32}$ to $\frac{1}{8}$ of an inch, and wherein each of said pre-grouted joints includes grooved recess means having an open end and a closed end formed in one surface thereof midway between adjacent edges of opposed tiles, said grooved recess means extending substantially across said tile sheet and having a depth equal to at least 40% of the maximum dimensional thickness of said opposed tiles.

15. The pre-grouted ceramic tile sheet of claim 14 wherein the depth of said grooved recess means is no more than 70% of the maximum dimensional thickness of said opposed tiles, the open end of said recess means being of a width equal to at least 60% and no more than 90% of the full width of said pre-grouted joint and the closed end of said recess means being of a width no less than 5% and no more than 90% of the full width of said pre-grouted joint.

References Cited

UNITED STATES PATENTS

| | | | |
|---|---|---|---|
| 615,515 | 12/1898 | Alexander | 52—390 |
| 715,831 | 12/1902 | Meeker | 52—390 |
| 746,290 | 12/1903 | Chappell | 52—384 |
| 2,073,130 | 3/1937 | Wallace | 52—396 |
| 2,108,226 | 2/1938 | Johnston | 52—604 X |
| 2,130,911 | 9/1938 | Teunon | 52—315 |
| 2,499,278 | 2/1950 | Olsen | 52—714 |
| 3,025,772 | 3/1962 | Palatini | 52—388 X |
| 3,185,748 | 5/1965 | MacDonald et al. | 52—390 X |
| 3,239,981 | 3/1966 | Fitzgerald | 52—309 |
| 3,319,392 | 5/1967 | Fitzgerald | 52—392 X |

FOREIGN PATENTS

| | | |
|---|---|---|
| 1,175,582 | 11/1958 | France. |
| 1,193,013 | 4/1959 | France. |
| 1,205,961 | 8/1959 | France. |
| 1,269,283 | 7/1961 | France. |
| 812,671 | 4/1959 | Great Britain. |

ALFRED C. PERHAM, *Primary Examiner.*

U.S. Cl. X.R.

52—173, 385, 389, 392